(12) United States Patent
Nemmers et al.

(10) Patent No.: US 8,406,922 B2
(45) Date of Patent: Mar. 26, 2013

(54) SYSTEM AND METHOD FOR SETTING THE TOOL CENTER POINT OF A ROBOTIC TOOL

(75) Inventors: Thomas Nemmers, Waterford, MI (US); Donald E. Jenkins, Lake Orion, MI (US); Terry L. Tupper, Grand Blanc, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 325 days.

(21) Appl. No.: 12/848,728

(22) Filed: Aug. 2, 2010

(65) Prior Publication Data

US 2011/0029132 A1 Feb. 3, 2011

Related U.S. Application Data

(60) Provisional application No. 61/230,355, filed on Jul. 31, 2009.

(51) Int. Cl.
*G05B 19/18* (2006.01)
*G06F 19/00* (2011.01)

(52) U.S. Cl. ........ 700/254; 700/182; 700/247; 700/250; 700/259; 700/257

(58) Field of Classification Search ........................ None
See application file for complete search history.

(56) References Cited

U.S. PATENT DOCUMENTS

| | | | | |
|---|---|---|---|---|
| 5,251,156 A * | 10/1993 | Heier et al. | ................... | 702/167 |
| 5,675,229 A * | 10/1997 | Thorne | ................... | 318/568.11 |
| 5,718,054 A * | 2/1998 | Kitajima | ................... | 33/227 |
| 6,175,413 B1 * | 1/2001 | Lucas | ................... | 356/614 |
| 6,430,472 B1 * | 8/2002 | Boillot et al. | ................... | 700/245 |
| 6,467,178 B1 * | 10/2002 | Svensson et al. | ................... | 33/286 |
| 6,812,665 B2 * | 11/2004 | Gan et al. | ................... | 318/568.11 |
| 7,299,556 B2 * | 11/2007 | Lippuner | ................... | 33/290 |
| 7,557,326 B2 * | 7/2009 | Boillot et al. | ................... | 219/121.63 |
| 7,581,331 B2 * | 9/2009 | Wong et al. | ................... | 33/644 |
| 8,296,962 B2 * | 10/2012 | Ferrara et al. | ................... | 33/542 |
| 2003/0200042 A1 * | 10/2003 | Gan et al. | ................... | 702/105 |
| 2007/0040527 A1 * | 2/2007 | Cardinale et al. | ................... | 318/575 |
| 2007/0050090 A1 * | 3/2007 | Sun et al. | ................... | 700/254 |
| 2008/0218592 A1 * | 9/2008 | Jahn | ................... | 348/187 |
| 2009/0062959 A1 * | 3/2009 | Sakhare et al. | ................... | 700/254 |
| 2009/0062960 A1 * | 3/2009 | Krishnasamy et al. | ................... | 700/258 |
| 2009/0118864 A1 * | 5/2009 | Eldridge et al. | ................... | 700/259 |
| 2009/0189974 A1 * | 7/2009 | Deering | ................... | 348/46 |

FOREIGN PATENT DOCUMENTS

WO 2009059323 A1 5/2009

\* cited by examiner

*Primary Examiner* — Ian Jen
(74) *Attorney, Agent, or Firm* — Fraser Clemens Martin & Miller LLC; William J. Clemens

(57) ABSTRACT

A system for calibrating a robotic tool includes a housing including an aperture for receiving the robotic tool, an image generating device disposed in the housing and positioned to generate an image of the robotic tool received through the aperture of the housing, wherein the image generating device generates an image signal representing the image of the robotic tool, a light source disposed in the housing to backlight the robotic tool received through the aperture of the housing, and a processor responsive to the image signal for calculating and monitoring a configuration of the robotic tool.

20 Claims, 5 Drawing Sheets

SYSTEM AND METHOD FOR SETTING THE TOOL CENTER POINT OF A ROBOTIC TOOL

CROSS-REFERENCE TO RELATED APPLICATION

This application claims the benefit of U.S. provisional patent application Ser. No. 61/230,355 filed Jul. 31, 2009.

FIELD OF THE INVENTION

The present invention generally relates to robotic tools. In particular, the invention is directed to a system and method for setting a tool center point (TCP) of a robotic tool.

BACKGROUND OF THE INVENTION

A tool center point is a six-dimensional vector defining the tool tip position of a robotic tool with respect to a robot face plate. The tool center point is essential so that the robot knows precisely where the tool is located. Although a robot is calibrated to know the precise location of the robot face plate at any given time, a robot may not precisely know the tool center point for a specific tool due to a variety of reasons. For example, the tool center point for any specific tool of a given tool type will vary between the individual tools of that type. Consequently, pre-specified tool center points are not entirely accurate for any specific individual tool of a tool type. Additionally, the center point may change due to a crash or due to wearing of the tool.

For example, FIG. 1 illustrates a welding tool 1 having a single welding wire 2 in a substantially straight configuration, as known in the prior art. As shown in FIG. 1, a tool center point (TCP) 3 of the welding wire 2 is located in a known or learned calibrated position (e.g. at a tip of the welding wire 2).

FIG. 2 illustrates the welding wire 2 of the welding tool 1 in a bent configuration. As shown in FIG. 2, a location of the tip of the welding wire 2 has been changed from the known or learned calibrated position. Therefore, the known or learned calibrated position of the TCP 3 is no longer accurate.

As another example, FIG. 3 illustrates a welding tool 4 having a pair of tandem welding wires 5,6 in a standard configuration, as known in the prior art. It is understood that a tool center point (TCP) of the welding tool 4 can be determined by the configuration of at least one of the welding wires 5, 6. Accordingly, where at least one of the welding wires 5, 6 has been bent or moved from the standard configuration, the TCP of the welding tool 4 is no longer accurate, as illustrated in FIGS. 4 and 5.

Current methods of determining the tool center point and monitoring the tool center point during robot operations provide for correcting a robot program if the tool position changes due to a crash, tool change or other extraneous factors.

One known method for determining a tool center point is physically measuring the location and orientation of the tool with respect to the robot face plate and entering the measured tool center point. Subsequent to entering the initially measured tool center point, the tool is swiveled about the position assumed to be the tool center point. If the tip of the tool moves, the assumed center point is adjusted. When the tip of the tool does not move when pivoted about the assumed tool center point, the appropriate tool center point has been achieved. This procedure takes approximately 15 minutes for a skilled technician and has an accuracy of about ±8 mm. This particular method requires a skilled technician, a significant amount of downtime for a robot and only offers a minimal amount of accuracy.

Shortcomings of prior art include:
- calibration relies on a manually taught pointer tool and calibration frame;
- typical systems are subjected to ambient light;
- user frame must be taught manually after training a precision tool; and
- a special IO is dedicated to the system increasing the cost of equipment.

It would be desirable to develop a system and method for setting a tool center point (TCP) of a robotic tool, wherein the system and the method overcome the shortcomings of the prior art discussed above.

SUMMARY OF THE INVENTION

Concordant and consistent with the present invention, a system and method for setting a tool center point (TCP) of a robotic tool overcomes the shortcomings of prior art as follows:

The present invention, referred to as iRTorchMate uses an iRVision™ system (FANUC Robotics America, Inc.) to optically calibrate a tool center point of a robotic tool. For example, the iRVision™ system is used to find a pair of tandem weld wires to determine a location of the weld wires with respect to a face plate of an associated robot. From the location data, the user tool position can be updated at any time during robot operation.

In one embodiment, a system for calibrating a robotic tool comprises: a housing including an aperture for receiving the robotic tool; an image generating device disposed in the housing and positioned to generate an image of the robotic tool received through the aperture of the housing, wherein the image generating device generates an image signal representing the image of the robotic tool; a light source disposed in the housing to backlight the robotic tool received through the aperture of the housing; and a processor responsive to the image signal for calculating and monitoring a configuration of the robotic tool.

The invention also provides methods for setting a tool center point of a robotic tool.

One method comprises the steps of: performing a calibration of an inspection station; moving the robotic tool into the inspection station; performing a setup of a robotic tool including generating a first image and a second image of the robotic tool to determine a tool center point of the robotic tool; and defining a user tool associated with the robotic tool based an analysis of the first image and the second image of the robotic tool.

Another method comprises the steps of:
a) providing an inspection station including an image generating device;
b) positioning the robotic tool in the inspection station;
c) generating a first image of the robotic tool using the image generating device;
d) locating a first point on the robotic tool based upon the first image;
e) locating a second point on the robotic tool based upon the first image;
f) rotating the robotic tool a pre-determined radial distance;
g) generating a second image of the robotic tool using the image generating device;
h) locating the first point on the robotic tool based upon the second image to define the first point in three dimensional space;

i) locating the second point on the robotic tool based upon the second image to define the second point in three dimensional space; and j) defining the tool center point relative to the first point and the second point.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
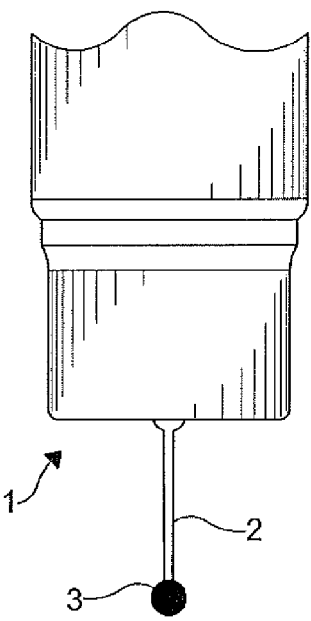
FIG. 1 is a side elevational view of a single wire weld tool known in the prior art.
Figure 2:
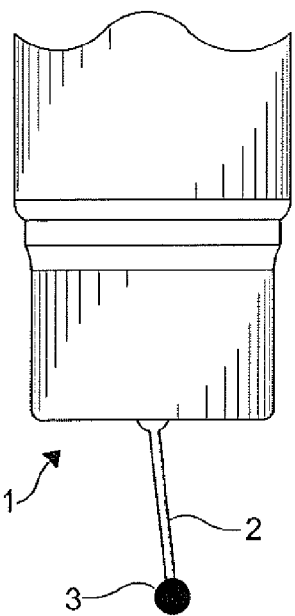
FIG. 2 is a side elevational view of the weld tool of FIG. 1, showing the wire in a bent position.
Figure 3:
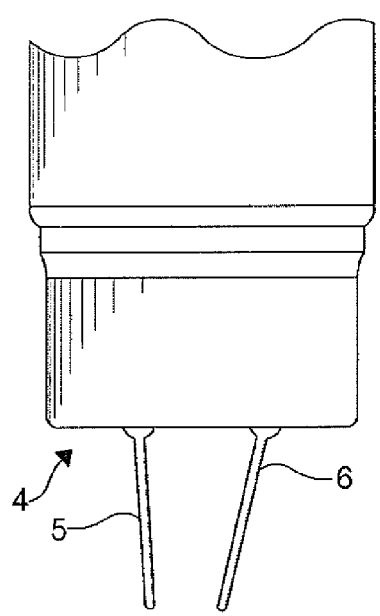
FIG. 3 is a side elevational view of a tandem wire weld tool known in the prior art.
Figure 4:
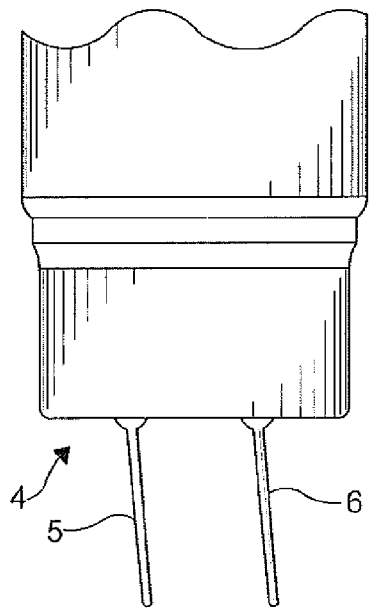
FIG. 4 is a side elevational view of the weld tool of FIG. 3, showing one of a pair of wires in a bent position.
Figure 5:
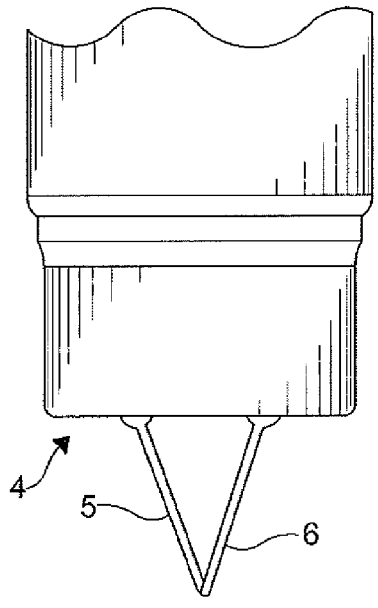
FIG. 5 is a side elevational view of the weld tool of FIG. 3, showing one of a pair of wires in a bent position and overlapping the other of the pair of wires.
Figure 6:
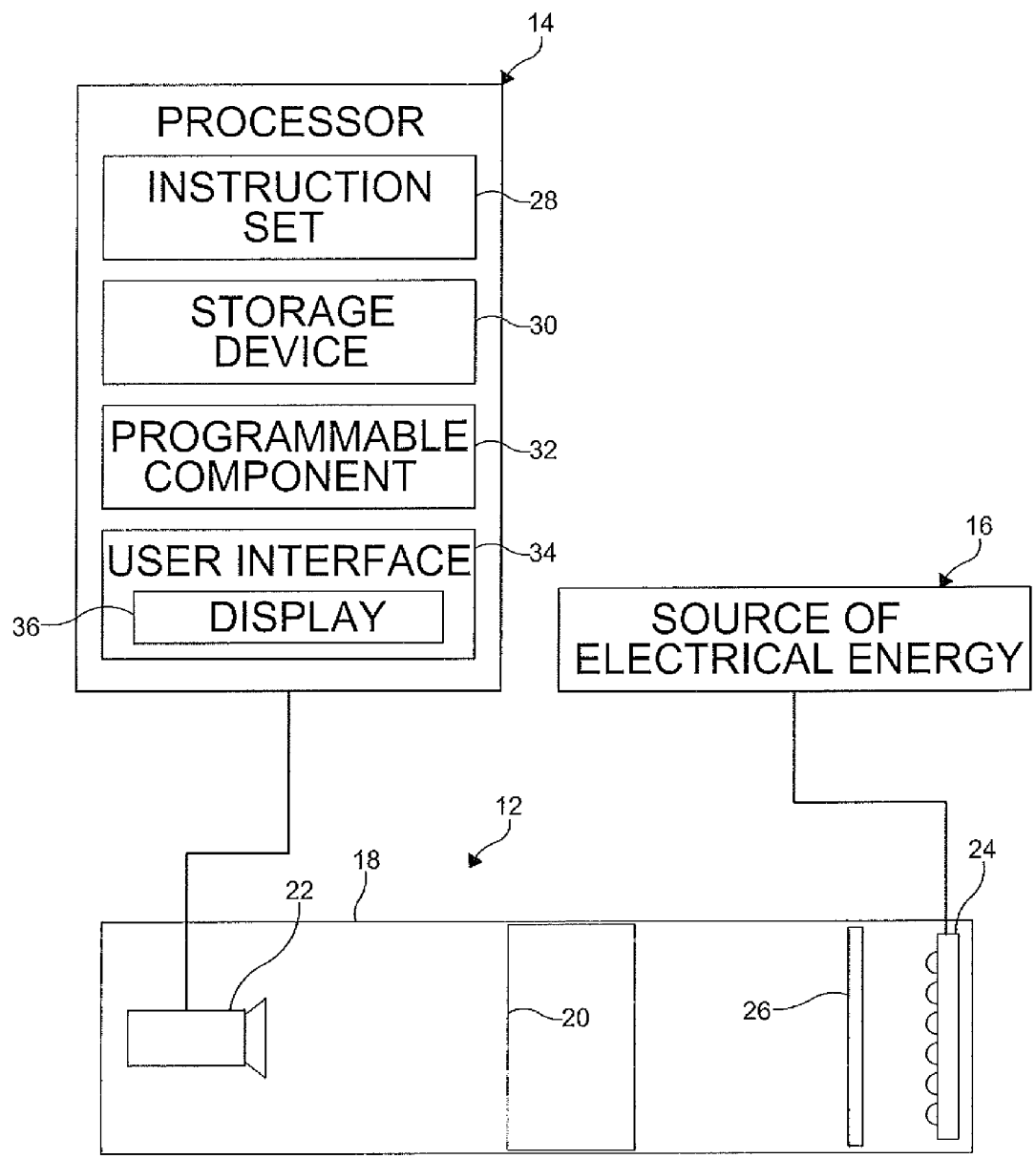
FIG. 6 is a schematic diagram of an inspection system according to an embodiment of the present invention.
Figure 7:
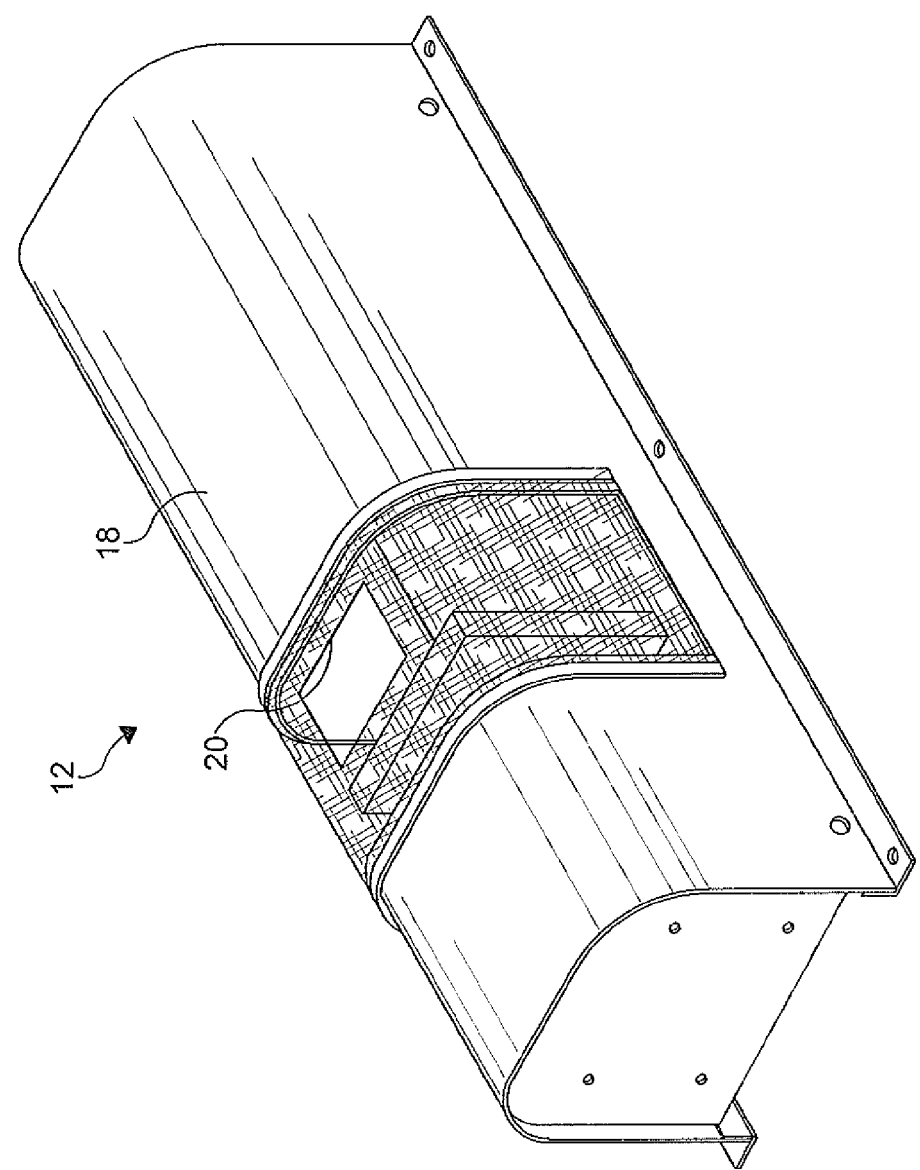
FIG. 7 is a perspective view of an inspection station of the inspection system of FIG. 6.

Referring now to FIGS. 6-7 there is illustrated an inspection system, indicated generally at 10. The system 10 includes an inspection station 12 in communication with a processor 14 and a source of electrical energy 16. It is understood that other components may be included.

The inspection station 12 includes a housing 18 having an aperture 20 formed therein to provide an entry point for a robotic tool such as a weld torch, for example. As a non-limiting example, the aperture 20 has a generally rectangular shape. The housing 18 can be selectively opened for access to the interior components. The housing 18 can be mounted in any location and orientation that allows a robotic tool to enter the housing 18 and rotate +/−45 degrees about the Z axis of the robotic tool. As a non-limiting example, a robotic tool is capable of rotating +/−30 degrees for Yaw and Pitch and +/−45 degrees for rotation. It is understood that any tool or robot arm attachment may be calibrated using the system 10.

In the embodiment shown, the housing 18 encloses an image generating device 22 and a light source 24. It is understood that other components may be at least partial enclosed by the housing 18. The image generating device 22 is typically a camera. It is understood that various cameras can be used. It is further understood that although a single image generating device 22 is shown, any number of the devices or cameras can be used. As a non-limiting example, the aperture 20 is positioned on the housing 18 to allow the robotic tool to enter an internal cavity of the housing 18 between the image generating device 22 and the light source 24. As such, the image generating device 22 is able to generate an image of the robotic tool in the cavity of the housing 18. The image generating device 22 is in data communication with the processor 14, wherein the image generating device 22 transmits an image signal to the processor 14 representing the image of the robotic tool. It is understood that an image of any tool can be generated by the image generating device 22.

The light source 24 typically includes at least one light emitting diode for emitting light having a pre-determined wavelength. As a non-limiting example, the light source 24 includes a plurality of light emitting diodes for emitting red light. A power cable 25 provides electric communication between the light source 24 and the source of electrical energy 16. In certain embodiments a light diffuser 26 is disposed between the image generating device 22 and the light source 24 to provide a substantially even light distribution for silhouetting the robotic tool in the generated image.

The processor 14 is in data communication with the image generating device 22 to receive data signals (e.g. an image signal) therefrom and analyze the signals based upon a pre-determined algorithm, software, computer code, mathematical process, or equation, for example. As shown, the processor 16 analyzes and evaluates a received data based upon an instruction set 28. The instruction set 28, which may be embodied within any computer readable medium, includes processor executable instructions for configuring the processor 14 to perform a variety of tasks and calculations. As a non-limiting example, the instruction set 28 may include a comprehensive suite of equations for calculating a tool center point from at least one generated image. It is understood that any equations can be used to model a tool center point, as appreciated by one skilled in the art of robotic tools. It is further understood that the processor 14 may execute a variety of functions such as controlling various settings of the image generating device 22 and the light source 24, for example.

As a non-limiting example, the processor 14 includes a storage device 30. The storage device 30 may be a single storage device or may be multiple storage devices. Furthermore, the storage device 30 may be a solid state storage system, a magnetic storage system, an optical storage system or any other suitable storage system or device. It is understood that the storage device 30 is adapted to store the instruction set 28. In certain embodiments, data retrieved from the image generating device 22 is stored in the storage device 30 such as generate images, for example. Other data and information may be stored in the storage device 30 such as the parameters calculated by the processor 14, a database of calibration settings, and a user-provided data, for example. It is further understood that certain known parameters and numerical models for robotic tools may be stored in the storage device 30 to be retrieved by the processor 14.

As a further non-limiting example, the processor 14 includes a programmable device or component 32. It is understood that the programmable device or component 32 may be in communication with any other component of the system 10 such as the image generating device 22 and the light source 24, for example. In certain embodiments, the programmable component 32 is adapted to manage and control processing functions of the processor 14. Specifically, the programmable component 32 is adapted to control the analysis of the data signals (e.g. image signal) received by the processor 14. It is understood that the storage device 30 may be adapted to store data and information in the storage device 30, and retrieve data and information from the storage device 30.

In certain embodiments, a user interface 34 is in communication, either directly or indirectly, with at least one of the image generating device 22 and the processor 14 to allow a user to selectively interact therewith. As a non-limiting example, the user interface 34 is a human-machine interface allowing a user to selectively and manually modify parameters of a computational model generated by the processor 14. As a further non-limiting example, the user interface 34 includes a display 36 for communicating visual information to a user. In certain embodiments, at least one of a setup screen and a status (runtime) screen is presented on the display. The setup screen defines values and tests to be used by the system 10. The status screen allows the user to observe an operation of the system 10. In certain embodiments, the status screen is color coded, wherein a warning is yellow, an error is red, a disabled function is blue, and a normal condition is green. However, any colors can be used. It is understood that any information and visual feedback can be communicated to the user such as data logs, tool identification, trend maps, and graphical representations of data generated by the system 10.

Figure 8:
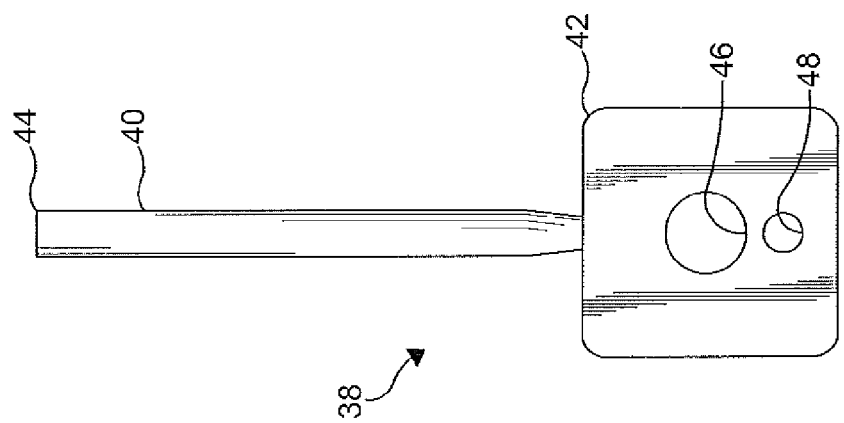
FIG. 8 is a front elevational view of a calibration tool according to an embodiment of the present invention.

FIG. 8 illustrates a calibration target device 38 including a stem 40 and a main body 42 coupled to the stem 40. A first end 44 of the stem 40 opposite the main body 42 can be selectively coupled to a portion of a robotic tool with a simple clamp. The stem 40 is typically elongate to allow the main body 42 to enter the inspection station without the actual robotic tool entering the inspection station.

The main body 42 of the calibration target device 38 includes a pair of circular apertures 46, 48 formed therethrough. The apertures 46, 48 are typically aligned along a predetermined axis and have different diameters. The configuration of the apertures 46, 48 allows the calibration target device 38 to be easily located by the system 10 in any orientation. When not in use, the calibration target device 38 can be removed from the robotic tool and placed inside the inspection station for safe keeping. It is understood that other calibration devices and targets can be used to calibrate the inspection station 12 and system 10.

Figure 9:
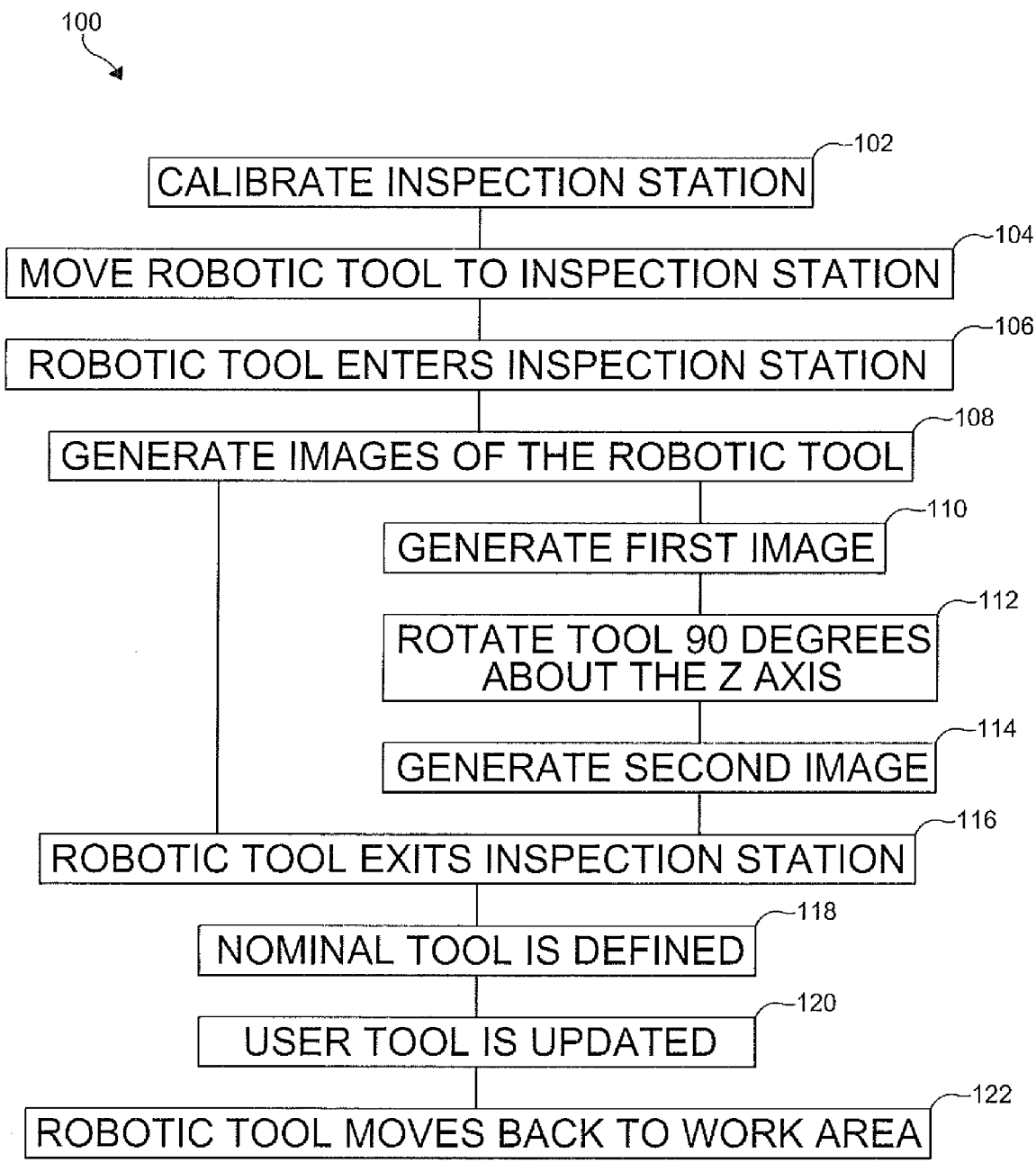
FIG. 9 is a schematic flow diagram of a method for setting a tool center point of a robotic tool according to an embodiment of the present invention.

In operation, once the inspection station 12 has been located and the appropriate software has been loaded, the user can perform a software setup and run a pre-determined routine associated with the system 10. FIG. 9 illustrates a method 100 for setting a tool center point of a robotic tool according to an embodiment of the present invention.

In step 102, the inspection station 12 is calibrated. In certain embodiments, calibration of the inspection station 12 begins by attaching the stem 40 of the calibration target device 38 to a robotic tool. A user can enter a camera setup screen and enable a LIVE mode, which presents a visual output on the display 36 showing a pair of cross hairs overlaid on a field of view of the image generating device 22. The user can select a particular application frame to use for the inspection station 12. The application frame is taught so that a Z axis is aligned along a motion path exiting and entering the inspection station 12 through the aperture 20. An X axis is aligned along a motion path moving to/from the image generating device 22. An origin is based on a cross hair intersection with a pre-determined point relative to the aperture 20 formed in the housing 18. Once the coordinate system is defined, the robot moves the calibration target device 38 into the inspection station 12 and positions the calibration target device 38 such that one of the apertures 46, 48 of the calibration target device 38 is substantially normal to the image generating device 22. Additionally, the calibration target device 38 is centered in the aperture 20 formed in the housing 18 (i.e. to/from camera) and centered in the overlaid cross hairs. The inspection station 12 including the image generating device 22 can be calibrated based upon the centered position of the calibration target device 38 and the known characteristics of the calibration target device 38, as appreciated by one skilled in the art. The calibration information can be stored as a station user frame. As a non-limiting example a default user frame number for the calibrated inspection station 12 is set. However, the user can use the setup screen to select a different user frame number, if desired. Thereafter, the calibration target device can be removed from the inspection station 12 and stored for safekeeping.

In step 104, the tool setup procedure typically includes selecting a pre-taught vision process or customizing a new vision process. Typically, various vision processes are stored in the storage device for particular robotic tools (e.g. standard tandem and single wire torch models). As a non-limiting example, the tool setup procedure requires defining a plurality of tool characteristics including: vision process name; number of wires (1 or 2); number of user tools (for each user tool); origin (wire 1, wire 2, midpoint); dominant axis (X or Z); X direction (wire 1 to 2, wire 2 to 1, Left, Right); Z direction (Up, down, wire 1, wire 2); origin offset distance along wire (>=0); and user tool numbers.

As a non-limiting example, a robot program is generated to move the robotic tool from a "Home" or "Perch" position to an entrance position adjacent the aperture 20 formed in the housing 18 of the inspection station 12, as shown in step 104. The home position and entrance position should be taught in the world coordinate frame. The entrance position at the station should be taught so the robotic tool is nearly normal to the aperture 20 and a "tip" of the robotic tool is adjacent the aperture 20 formed in the housing 18 of the inspection station 12.

The robot moves the robotic tool incrementally through the aperture 20 formed in the housing 18 and the robotic tool enters the inspection station 12 until the tool is substantially centered in the field-of-view of the image generating device, as shown in step 106.

In step 108, at least two images of the robotic tool are generated and analyzed to determine a tool center point (TCP). Specifically, the tool is rotated to a first view position (e.g. −45 degree position) and a first image is generated, as shown in step 110. Four pre-determined targets located on the robotic tool are "found" by the system 10 and four offsets are obtained and stored (e.g. in the storage device 30 or vision registers). In step 112, the robotic tool is rotated 90 degrees to a second position (e.g. +45 degree position). In step 114, a second image of the robotic tool is generated based on the second position. Four offsets based on the pre-determined targets identified in the first image of the robotic tool are obtained and stored. The stored position values (e.g. 8 vision registers) are used to calculate the new tool position, as described in further detail below. Depending on the setup options, the tool and/or tool offsets are updated.

In step 116, the robotic tool exits the inspection station 12.

In step 118, a nominal tool is defined. In certain embodiments, the user can manually set the nominal tool values for each robotic tool. Alternatively, the user can create a program to set the nominal values. In any event, the future offsets and the delta calculations are typically based on the change from the nominal tool values defined in step 118.

In step 120, a user tool for a particular tool is updated. In certain embodiments the user tool is updated based upon a measure user tool process that measures the location of a pre-defined portion of the robotic tool and creates a current (Internal) user tool. The current user tools are compared with the nominal user tools to determine any changes or offsets. The system 10 tracks changes in X, Y, Z, W, P, R, distance, and tilt elements, wherein the changes are represented by delta values. Distance is defined as the length of a three dimension line that connects a pre-defined point on the current user tool with the reciprocal point on the nominal tool. Tilt is defined as a combination of the Yaw and Pitch and represents an angle change with respect to the Z axis. It is understood that the distance and tilt measurements are easier to conceptualize than conventional XYZWPR coordinates. It is further understood that the delta values can be further analyzed to indicate undesirable changes in the robotic tool orientation. As a non-limiting example, the user can enter threshold values for each delta to indicate a warning or an error condition. The Error and Warning condition can also be setup to require user recovery.

In step 122, the robotic tool moves back to work area with updated user tool values having accurate tool center point. The resulting user tool values reflect a new XYZWPR for the robotic tool. Where a single wire weld tool is used, XYZ is the tip of the wire, +x is in the direction the tool moves when welding, +z is up the wire, and +y is defined by X and Z. Where a double wire tool is used, XYZ is the tip of the forward direction wire, +x is in the general direction the tool moves when welding (refined so both wire tips are on the tool's X axis), +z is up wire 1, and +y is defined by X and Z.

Figure 12:
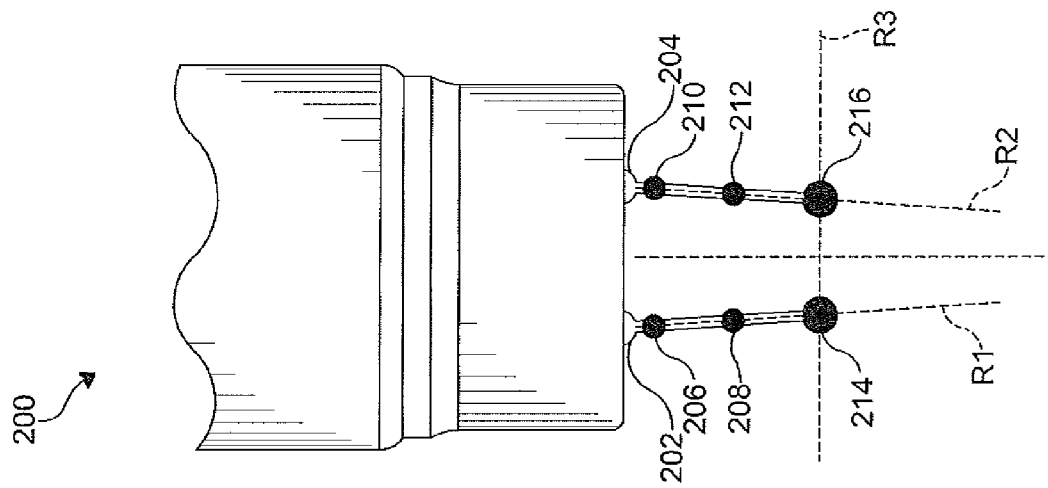
FIGS. 10-12 are fragmentary front elevational views of a mathematical modeling of a tandem welding tool according to the method of FIG. 9.
Figure 11:
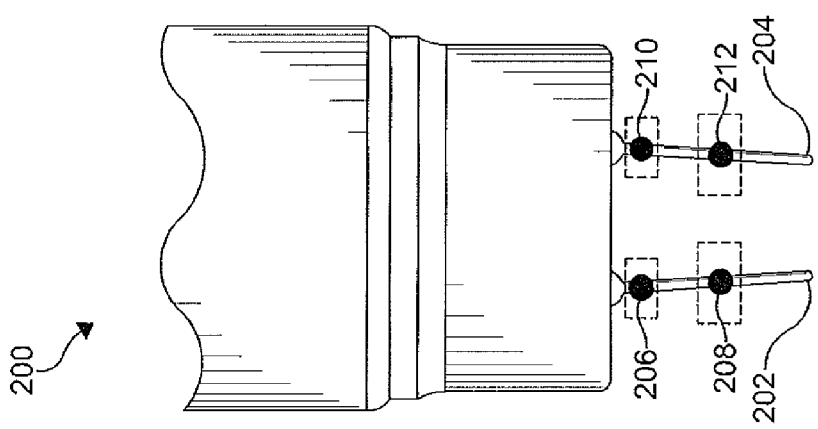
Figure 10:
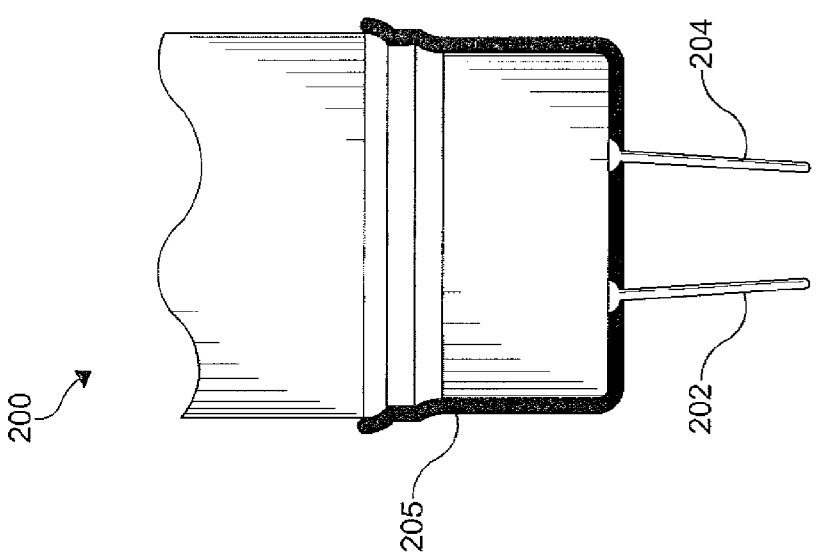

As a non-limiting example, FIGS. 10-12 illustrate a mathematical modeling associated with the method 100. Specifically, a tandem welding tool 200 is shown having a pair of welding wires 202, 204.

As more clearly shown in FIG. 10, while the robotic tool is positioned within the field of view of the image generating device, a portion of the robotic tool (i.e. parent tool) is initially located, as identified by an outline 205. In order to teach the user tool for the tandem welding tool 200, four points (i.e. targets) 206, 208, 210, 212 need to be located in three dimension space, as shown in FIG. 11. Specifically, while the robotic tool is in the first position, the processor 14 analyzes the first image to locate the first point 206 and an XYZ coordinate representing a position where a pre-defined view line passes through a calibration plane defined during the calibration step 102. As a non-limiting example, the XYZ coordinate of the view line intersection, the first point 206, and the known focal point of the image generating device 22 are each disposed along a first three dimensional line. The processor 14 then repeats the analysis to locate points 208, 210, 212 in a fashion similar to that described above for the point 206.

The robotic tool is then rotated and the process is repeated to re-locate the points 206, 208, 210, 212 in the second image of the robotic tool. Specifically, the first three dimensional line passing through the XYZ coordinate of the view line intersection, the first point 206, and the known focal point of the image generating device 22 can be intersected with a second three dimensional line defined from the second image. The intersection of the first three dimensional line and the second three dimensional line associated with the point 206 represents an XYZ value of the point 206. As similar process is repeated to define the XYZ values for the points 208, 210, 212.

As more clearly shown, the point 206 and the point 208 can be connected using a three dimensional reference line R1. A tool center point 214 based upon the wire 202 can be created from the direction of the reference line R1, the origin point 206 and a pre-defined distance (e.g. 17 mm) associated with the robotic tool. The process is repeated for the wire 204 using the points 210, 212 to generate reference line R2 and tool center point 216. A user tool frame can be calculated from the data points defined above. Specifically, a reference line R3 through the tool center points 214, 216 defines the X direction. The cross product of the reference line R1 and the reference line R3 defines the XZ plane. Since the origin point, the X axis, and the XZ plane are known, there is enough information to calculate the entire user tool (frame), as appreciate by one skilled in the art. It is understood that a similar process is performed for determining the user tool for the wire 204. It is further understood that a third user tool can be created by setting the origin point as a centroid along a reference line R4 based on the user tool for the wire 202 and the user tool for the wire 204, wherein the orientation is the same as the user tool for the wire 202.

As a non-limiting example system 10 can store and display any number of data fields relating to the operation of the system 10 including:
A) Number of Guns—indicates the number of guns supported by the system 10 and is typically read-only;
B) Reset User Tool—a Boolean value indicates if the associated user tool is to be updated or only the tool offset;
C) DOUT Warning Indicator—is set when a warning occurs and is cleared after the successful test;
D) DOUT Error Indicator—is set when an error occurs;
E) Warning Threshold—a value including limits for (X, Y, Z, W, P, R, Distance, Tilt) of the absolute values of the Delta Tool elements, wherein a warning is posted if the limits are exceeded;
F) Error Threshold—a value including limits for (X, Y, Z, W, P, R, Distance, Tilt) of the absolute values of the Delta Tool elements wherein an error is posted if the limits are exceeded;
G) Gun Index—indicates the index of the current gun;
H) Group Number—indicates the motion group number, wherein multi-arm controllers may support multiple motion groups;
I) Vision Process Name—a name of the vision process used for measuring the wire locations of a torch;
J) Number of Wires—number of wires in the torch (e.g. 1 or 2);
K) Number of Tools—number of User tools associates with a particular tool (e.g. torch);
L) Tool Index—indicates the index of the selected tool;
M) User Tool Number—indicates the User Tool Number that is to be updated;
N) Dominant X Axis—When calculating a Tool, the X axis, Y axis, and Z axis must be perpendicular, therefore one axis is always dominant and the other axis must adjust to stay in the same plane;
O) Tool X Direction—the X direction is from wire 2 to wire 1 (left) or from wire 1 to wire 2 (right) for a tandem wire;
P) Tool Z Direction—the Z direction indicates the general direction of the Z axis, unless the dominant axis is set to Z, wherein the choices for Z axis can be Wire 1 up, Wire 1 Down, Wire 2 Up, Wire 2 down, Image Up, Image Down;
Q) Nominal Tool—the preset value of a nominal tool;
R) Current Tool—the calculated value of the user tool
S) Real Tool Offset—the calculated value of the difference in the Nominal Tool and the Current tool, wherein the tool offset can be calculated using the robot equations:
(1) Current Tool=Nominal Tool: Real Tool Offset and
(2) Real Tool Offset=INV(Nominal Tool): Current Tool;

T) Move Tool Offset—the Tool Offset associated with the MOVE, Tool Offset PR[x] instruction, wherein the tool offset can be calculated using the robot equations: (2) Real Tool Offset=INV(Nominal Tool): Current Tool. (3) INV(Real Tool Offset)=INV(INV(Nominal Tool): Current Tool). (4) Move Tool Offset=INV(Current Tool): Nominal Tool;

U) Tool Difference—the arithmetic difference of the Nominal Tool and CurrentTool;

V) Delta Offset—includes the extracted elements (X, Y, Z, W, P, R) of the Tool Difference and the calculated Distance and Tilt value, wherein the absolute values of these elements are compared with the threshold values, the distance is calculated as the 'square root of X squared+Y squared+Z squared and the Tilt is calculated as the Arc Sine of the Z value of the Tools Approach vector.

In certain embodiments, a user recovery option allows a user to pause the operations of the system 10 until a user responds to a recovery screen. The standard recovery choices are Retry/Retest, Skip/Continue, and Abort. As a non-limiting example, the Retry/Retest option is used to repeat the Measure User Tool process. The Skip/Continue option is used to ignore any warning or Error and continues processing as if there was no error. The Abort option is used to exit the Measure Station, (optionally move to a safe position), and abort the program. As a further non-limiting example, the user can select a general register used to return the recovery code. If the method 100 detects no error then the Skip/Continue option is returned as the result. It is understood that the calling program interrogates the result register to determine a requisite action (continue, retry, abort), allowing the user to customize the system 10 and method 100 for each action. For example, the user may want the robot to move to a maintenance position on an Abort result.

The system 10 and the method 100 overcome the shortcomings of the prior art discussed above. Specifically, a user tool adjustment can be completed in two to three seconds and the user frames are taught automatically. The system 10 and the method 100 support various robotic tools including single and tandem wire welding tools. The system 10 and the method 100 do not require special or dedicated I/O.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A system for calibrating a robotic tool, the system comprising:
   a housing including an aperture for receiving the robotic tool;
   an image generating device disposed in the housing and positioned to generate an image of the robotic tool received through the aperture of the housing, wherein the image generating device generates an image signal representing the image of the robot tool;
   a light source disposed in the housing to backlight the robotic tool received through the aperture of the housing; and
   a processor responsive to the image signal for calculating and monitoring a configuration of the robotic tool.

2. The system according to claim 1, further comprising a calibration target device coupled to the robotic tool.

3. The system according to claim 2, wherein the calibration target device includes a main body having an aperture formed therein and an elongate stem coupled to the main body.

4. The system according to claim 1, further comprising a light diffuser disposed between the image generating device and the light source.

5. The system according to claim 1, wherein the light source is at least one light emitting diode for emitting light at a pre-determined wavelength.

6. The system according to claim 1, wherein the robotic tool is a welding tool.

7. The system according to claim 1, wherein the robotic tool is a welding tool having at least one welding wire and the image includes a silhouette of the at least one welding wire.

8. The system according to claim 1, wherein the processor is responsive to the image signal for calculating and monitoring a tool center point of the robotic tool.

9. A method for setting a tool center point of a robotic tool, the method comprising the steps of:
   performing a calibration of an inspection station;
   moving the robotic tool into the inspection station;
   performing a setup of a robotic tool including generating a first image and a second image of the robotic tool to determine a tool center point of the robotic tool; and
   defining a user tool associated with the robotic tool based an analysis of the first image and the second image of the robotic tool.

10. The method according to claim 9, wherein the inspection station includes a housing having an aperture for receiving the robotic tool.

11. The method according to claim 10, wherein the inspection station includes an image generating device disposed in the housing and positioned to generate the first image and the second image of the robotic tool received through the aperture of the housing.

12. The method according to claim 10 wherein the inspection station includes a light source disposed in the housing to backlight the robotic tool received through the aperture of the housing.

13. The method according to claim 11, wherein the step of performing a calibration of an inspection station includes positioning a calibration target device in a field-of-view of the image generating device.

14. The method according to claim 9, wherein the step of performing a calibration of an inspection station includes defining a coordinate system relative to the inspection station.

15. The method according to claim 9, further comprising the step of rotating the robotic tool 90 degrees about a pre-defined axis between the generating of the first image and the generating of the second image.

16. A method for setting a tool center point of a robotic tool, the method comprising the steps of:
   a) providing an inspection station including an image generating device;
   b) positioning the robotic tool in the inspection station;
   c) generating a first image of the robotic tool using the image generating device;
   d) locating a first point on the robotic tool based upon the first image;
   e) locating a second point on the robotic tool based upon the first image;
   f) rotating the robotic tool a pre-determined radial distance;
   g) generating a second image of the robotic tool using the image generating device;
   h) locating the first point on the robotic tool based upon the second image to define the first point in three dimensional space;
   i) locating the second point on the robotic tool based upon the second image to define the second point in three dimensional space; and j) defining the tool center point relative to the first point and the second point.

17. The method according to claim 16, wherein the inspection station includes a housing having an aperture for receiving the robotic tool.

18. The method according to claim 17 wherein the inspection station includes a light source disposed in the housing to backlight the robotic tool received through the aperture of the housing.

19. The method according to claim 16, further comprising the step of performing a calibration of an inspection station prior to the step of positioning the robotic tool in the inspection station.

20. The method according to claim 19, wherein the step of performing a calibration of an inspection station includes defining a coordinate system relative to the inspection station.

* * * * *